US010141596B2

(12) United States Patent
Wang et al.

(10) Patent No.: US 10,141,596 B2
(45) Date of Patent: Nov. 27, 2018

(54) STACK ARRAY IN SOLID OXIDE FUEL CELL POWER GENERATION SYSTEM

(71) Applicant: NINGBO INSTITUTE OF MATERIALS TECHNOLOGY & ENGINEERING, CHINESE ACADEMY OF SCIENCES, Ningbo (CN)

(72) Inventors: Weiguo Wang, Ningbo (CN); Jun Peng, Ningbo (CN); Haolei Ru, Ningbo (CN); Shuang Ye, Ningbo (CN)

(73) Assignee: NINGBO INSTITUTE OF MATERIALS TECHNOLOGY & ENGINEERING, CHINESE ACADEMY OF SCIENCES, Ningbo (CN)

( * ) Notice: Subject to any disclaimer, the term of this patent is extended or adjusted under 35 U.S.C. 154(b) by 420 days.

(21) Appl. No.: 14/894,989

(22) PCT Filed: Jun. 5, 2013

(86) PCT No.: PCT/CN2013/076751
§ 371 (c)(1),
(2) Date: Jan. 6, 2016

(87) PCT Pub. No.: WO2014/190564
PCT Pub. Date: Dec. 4, 2014

(65) Prior Publication Data
US 2016/0111749 A1 Apr. 21, 2016

(30) Foreign Application Priority Data
May 30, 2013 (CN) .......................... 2013 1 0212920

(51) Int. Cl.
*H01M 8/124* (2016.01)
*H01M 8/249* (2016.01)
(Continued)

(52) U.S. Cl.
CPC ......... *H01M 8/249* (2013.01); *H01M 8/0625* (2013.01); *H01M 8/0631* (2013.01);
(Continued)

(58) Field of Classification Search
CPC .. H01M 8/249; H01M 8/0625; H01M 8/1246; H01M 8/12; H01M 8/1231;
(Continued)

(56) References Cited

U.S. PATENT DOCUMENTS 5,298,341 A * 3/1994 Khandkar ............ B01D 53/326
429/460
7,659,022 B2 2/2010 Valensa et al.
(Continued)

FOREIGN PATENT DOCUMENTS

CN 1781208 A 5/2006
CN 102694191 A 9/2012
(Continued)

OTHER PUBLICATIONS

Office Action from Canadian Patent Office for Application No. 2,913,864 dated Apr. 10, 2017.
(Continued)

*Primary Examiner* — Eugenia Wang

(57) ABSTRACT

A stack array in a solid oxide fuel cell power generation system is provided. The stack array comprises a supporting body and a stack group, wherein the supporting body is in a layered structure and comprises one layer or at least two layers of supporting units; and on each layer of the supporting units, a plurality of stacks are sequentially arranged to form the stack group, and each stack is horizontal, and fasteners are provided between the stacks to enable the stack groups and the supporting units to form a pressurized fastening structure. The stack array of the present disclosure simplifies the arrangement of pipelines in the related art,
(Continued)

enables effective pressurized fastening on the stacks, so as to allow the whole stack array to be compact and steady, while facilitating the detach, repair and maintenance of the stacks, which is favorable for the integration of the system.

10 Claims, 4 Drawing Sheets

(51) Int. Cl.
*H01M 8/0612* (2016.01)
*H01M 8/1246* (2016.01)
*H01M 8/2428* (2016.01)
*H01M 8/2432* (2016.01)

(52) U.S. Cl.
CPC ....... *H01M 8/1246* (2013.01); *H01M 8/2428* (2016.02); *H01M 8/2432* (2016.02); *H01M 2008/1293* (2013.01); *Y02E 60/525* (2013.01); *Y02P 70/56* (2015.11)

(58) Field of Classification Search
CPC ............. H01M 8/2404; H01M 8/2432; H01M 8/2428; H01M 8/248; H01M 2008/1293; H01M 8/0631; Y02P 70/56; Y02E 60/525
See application file for complete search history.

(56) References Cited

U.S. PATENT DOCUMENTS

| | | | |
|---|---|---|---|
| 2007/0048564 A1 | 3/2007 | Chang et al. | |
| 2008/0038622 A1* | 2/2008 | Valensa | H01M 8/2475 429/420 |
| 2011/0117457 A1* | 5/2011 | Nakamura | H01M 8/04014 429/408 |

FOREIGN PATENT DOCUMENTS

| | | |
|---|---|---|
| EP | 0 585 049 A1 | 3/1994 |
| JP | 62-24570 | 2/1987 |
| JP | H06-196197 A | 7/1994 |
| JP | 2001-110439 A | 4/2001 |
| JP | 2001-328801 A | 11/2001 |
| JP | 2001-342002 A | 12/2001 |
| JP | 2004-207241 A | 7/2004 |
| JP | 2005-149995 A | 6/2005 |
| JP | 2005-166355 A | 6/2005 |
| JP | 2007-18855 A | 1/2007 |
| JP | 2007-213926 A | 8/2007 |
| JP | 2010-113981 A | 5/2010 |
| KR | 10-1713344 B1 | 3/2017 |
| WO | WO 94/22179 A1 | 9/1994 |
| WO | WO 2007/087305 A2 | 8/2007 |

OTHER PUBLICATIONS

European Search Report for EP Application No. 13885989.7, dated Oct. 6, 2017.
Office Action from Korean Patent Office for Application No. 10-2015-7037158 dated Oct. 6, 2017.
Office Action from Russian Patent Office for Application No. 2015155449 dated Jul. 13, 2017.
Extended European Search Report for EP Application No. 13885989.7, dated Jan. 19, 2017.
Office Action from Japanese Patent Office for Japanese Patent Application No. 2016-515596 dated Nov. 22, 2016.
Office Action for Candian Patent Application No. 2,913,864, dated Dec. 18, 2017.
International Search Report for PCT/CN2013/076751 filed on Jun. 5, 2013.
Chinese Office Action for Application No. 201310212920.5, dated Dec. 25, 2014.

* cited by examiner

STACK ARRAY IN SOLID OXIDE FUEL CELL POWER GENERATION SYSTEM

CROSS REFERENCE TO RELATED APPLICATIONS

The present invention is a U.S. National Stage of PCT/CN2013/076751, filed Jun. 5, 2013, which claims the priority of Chinese patent application No. 201310212920.5 filed on May 30, 2013, which are incorporated herein by reference.

TECHNICAL FIELD

The present invention relates to a solid oxide fuel cell (SOFC) power generation system, particularly to a stack array in the solid oxide fuel cell (SOFC) power generation system.

BACKGROUND

The solid oxide fuel cell (SOFC) power generation system is a device which can convert chemical energy into electric energy directly, usually utilizing light hydrocarbon such as natural gas as fuels, and the chemical energy in the fuels is converted into the electric energy efficiently and cleanly. The distributed power station based on the SOFC power generation system may conveniently utilize the natural gas supplied from the existing natural gas pipeline network to generate electricity, and can provide power to the power grid, therefore, the SOFC power generation system is a power generation method with great commercial prospects.

The core component of the SOFC power generation system is the stack array, which consists of a plurality of stacks in a certain structure of distribution, and the reaction of power generation occurs in the stack array. As the raw material of the light hydrocarbon such as natural gas is supplied into the SOFC power generation system, the raw material is firstly subjected to a reforming reaction in the reformer, then the reformed gas is supplied into the stack array to generate power. Therefore, the stack array of the SOFC power generation system is a power generation component.

The configuration of the stack array is one of the key factors in the design of the SOFC power generation system. In order to improve the efficiency and stability of the stacks, the following needs to be done: 1) in the stack array, the stacks should have a good pressurized fastening mechanism in which a uniform pressure is applied on each of the stacks, so as to improve the efficiency of the stacks; 2) in the stack array, the gas pipelines should be in a proper arrangement to reduce external pipelines as possible, so as to reduce the complexity in pipeline connection; 3) when a fault occurs in a stack in the stack array, it should be easy and convenient to detach, repair and replace the single stack, while the other normal stacks surrounding the faulted one should not be affected.

In the existing design scheme of the SOFC power generation system, such as in American patents U.S. Pat. No. 7,659,022B2 and US 2012/0178003A1, FIG. 1 illustrates the structure of the stack array 1', which is a ring-shaped array of a plurality of stack groups 2' disposed in a circular shape; each of the stack groups 2' consists of a plurality of stacks 4' stacked in the vertical direction; as shown in FIG. 2, each of the stacks 4' is arranged vertically, that is, the plane where the gas inlet and the gas outlet of each of the stacks 4' are located is approximately horizontal. The stack array 1' further comprises a reformer 3' supplying gas to the stack array. However, in the above mentioned structure, the stacks are directly stacked in the vertical direction and overall pressurized in the vertical direction, and there exist the following problems: 1) the number of the pipelines for connection, specifically the number of the external pipelines is greatly increased, which increases the complexity in the integration of stacks and reduces the reliability of the stack array; 2) it is not convenient for the repair and maintenance of the stack array, particularly, when a fault occurs in one or more stacks in the stack array and the faulted stack needs to be replaced with new one, the pressurizing mechanism in the related art is not convenient for the replacement of the faulted stacks; 3) vertical pressurizing may generate non-uniform distribution of vertical pressure on each of the stacks, reducing the stability and reliability of the stacks and further influencing the reliability of the overall stack array.

SUMMARY OF THE INVENTION

The present invention provides a novel stack array in the SOFC power generation system. The stack array comprises supporting body and stack group; the supporting body has a layered structure and comprises at least one layer of supporting unit; the stack array consists of at least one stack group; each layer of the supporting units supports at least one stack group; each stack group consists of a plurality of stacks, and FIG. 3 illustrates an example of three hole stack, but the present disclosure is not limited to this, stacks with two holes or other number of holes may also be used, and as shown in FIG. 3, each of the stacks is horizontal, that is, the plane where the gas inlet and the gas outlet of each stack are located is approximately vertical to the horizontal plane, and in each of the stack groups, fasteners are provided between the stacks so as to enable the stack groups and the supporting units to form a pressurized fastening structure.

In the above technical solution, the arrangement of the plurality of stacks in each stack group is not limited to a certain structure, they may be provided in a ring-opening structure (i.e. the head end is not connected with the tail end), such as linear arrangement of a plurality of stacks, etc.; or they may be provided in a closed ring-shaped structure (i.e. the head end is connected with the tail end), such as circular arrangement of a plurality of stacks, etc. Preferably, each of the stack groups comprises a plurality of stacks, and the plurality of stacks are sequentially arranged to form a closed ring-shaped structure. More preferably, each of the stack groups comprises a plurality of stacks, and the plurality of stacks are sequentially arranged to form a circular structure.

In the above technical solution, there is no limitation on the structure and position of the reformers supplying gas to the stack array. The reformer may comprise one or more selected from a group consisting of a single-tube type reformer, a multi-tube type reformer and a plate type reformer or the like, preferably is the plate type reformer. There is no limitation on the position of the reformers, preferably, the reformers and the gas pipes between the reformers and the stacks are provided in the fasteners, and the reforming gas generated by the reformers is supplied to the stacks through the gas pipes; in this preferable structure of the stack array, the reformer and the gas pipe may be provided in each fastener, preferably, the reformers and the gas pipes may be provided as the following (a)-(d) to reduce the number of the reformers, thereby reducing the cost.

(a) When each of the stack groups is arranged in a closed ring-shaped structure and the number of the fasteners is 2N (N is a natural number), taking any one of the fasteners as a starting point for counting, the reformer and the gas pipe are provided in at least the $2n^{th}$ fastener (n is each of all the natural number equal to or less than N);

(b) When each of the stack groups is arranged in a closed ring-shaped structure and the number of the fasteners in a circular arrangement is 2N+1 (N is a natural number), taking any one of the fasteners as a starting point for counting, the reformer and the gas pipe are provided in at least the $2n^{th}$ fastener (n is each of all the integers equal to or less than N), and the $1^{st}$ fastener or the $(2N+1)^{th}$ fastener is also provided therein with the reformer and the gas pipe;

(c) When each of the stack groups is arranged in a ring-opening structure and the number of the fasteners is 2N (N is a natural number), taking the first fastener at one end of the ring-opening structure as a starting point for counting, the reformer and the gas pipe are provided in at least the $(2n-1)^{th}$ and the $2n^{th}$ fasteners (n is each of all the natural numbers less than or equal to N);

(d) When each of the stack groups is arranged in a ring-opening structure and the number of the fasteners is 2N+1 (N is a natural number), taking the first fastener at one end of the ring-opening structure as a starting point for counting, the reformer and the gas pipe are arranged in at least the $(2n-1)^{th}$ fastener (n is each of all the integers less than or equal to N);

In the above technical solution, the stacks in the stack groups have no limitation on their number, depending on practical needs, preferably, 3~12 stacks/stack group.

In the above technical solution, the supporting units in the supporting body have no limitation on their number of layers, depending on practical needs, preferably, 2~10 layers.

In the above technical solution, the fasteners have no limitation on their materials, preferably, the fasteners are made of ceramic or stainless steel. In one implementation, the fasteners and the supporting units are fastened and connected through a fastening screw hole.

The gas pipe is provided in the fastener to enable the communication of gas between the reformer and the stacks, thus reducing the amount of external pipelines exposed to the outside, allowing the stack array to be more simple and compact.

From the above, the present invention provides a novel stack array in a SOFC power generation system, in which, the stacks are horizontally arranged on the layered supporting body; and on each layer of supporting units, a plurality of horizontally arranged stacks are sequentially arranged to form a stack group, in which fasteners are provided between the stacks to realize pressurized fastening on the stack groups, and allow the stack groups to be steadily arranged on the supporting units. The present invention has the following advantages:

(1) The arrangement of stacks is improved and the supporting body having a layered structure is employed to support, so that the stack array is more simple and steady; and, with the support from the supporting body in a layered structure, the number of the supporting units and the number of the stacks on each layer of the supporting units can be adjusted according to practical needs, allowing a more flexible way of control;

(2) In order to further improve the steadiness of the stack array, the fasteners may be provided between the stacks according to practical needs to enable the stack groups and upper and lower supporting units to form a pressurized fastening structure, so as to generate a uniform pressurized fastening effect on the stacks, and in this way, the stacks are uniformly pressurized increasing the stability of performance of the stack array, and the non-uniform distribution of pressure on the stacks due to the vertical pressurizing in the related art is overcome, and besides, when one or more stacks need to be replaced, it may be operated by only unscrewing the fastener;

(3) In the preferred structure, the reformers and the gas pipes in the hot zone may be provided in the fasteners, thus the reformers and the gas pipes are arranged inside the stack array, not only improving the utilization of space but also avoiding too many gas pipes exposed to the outside in the hot zone, allowing the connections between the functional components in the hot zone to be more compact. In the prior art, the reformer is arranged in the center of the circular stack array, thus the connections of gas pipes between the reformers and the gas inlet or outlet of each stack are in a radial shape, making the connections of gas pipes are complicated and exposed to the outside, which is not good for system integration, and the novel stack array of the present invention having a novel structure is capable of solving the above problems effectively. Additionally, in the preferred structure, on each layer of the supporting units, the arrangement of the reformers is flexible, and the reformer may be arranged in each of the fasteners, so as to supply the reforming gas generated from the single reformer to single stack through the gas pipe to generate power; and the reformers may be alternately provided in the fasteners arranged circularly, so as to supply the reforming gas generated from the single reformer to its adjacent two stacks through the gas pipes to generate power, thus reducing the number of reformers and manufacturing cost, improving the efficiency of operation;

(4) The stack array having this structure allows the detach and repair work of stacks to be convenient and easy, particularly, when a fault occurs in a stack in the stack array and the stack needs to be replaced, the structure allows conveniently detaching the faulted stack and replacing it with a new one, thus greatly facilitating the maintenance work for the stack array, i.e., when a fault occurs in a stack in the stack array, the overall detaching such as in the related art is avoided and it can be operated by only replacing the faulted stack(s) with new one(s).

DETAILED DESCRIPTION OF THE EMBODIMENTS

Figure 1:
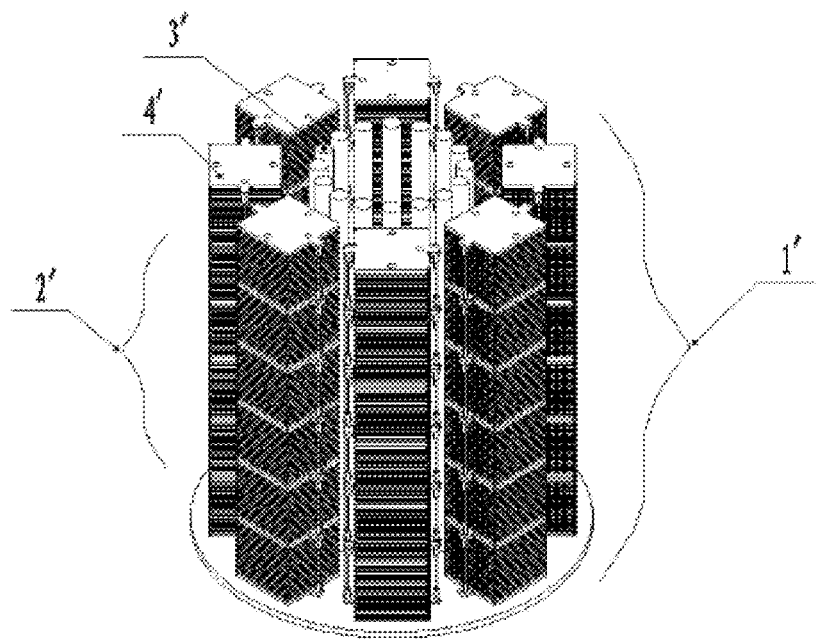
FIG. 1 is a schematic view of the stack array in the SOFC power generation system in prior art.
Figure 2:
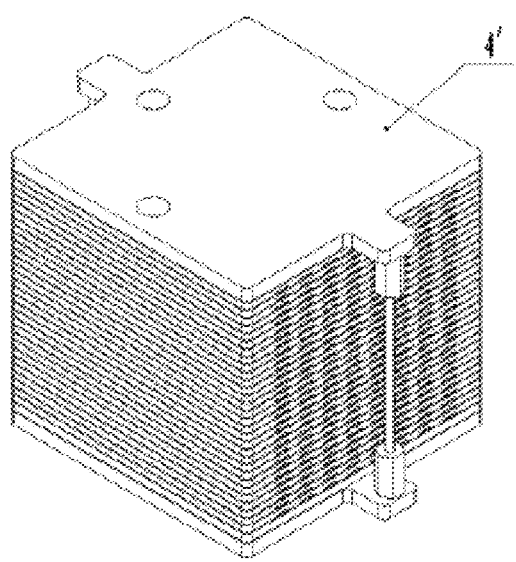
FIG. 2 is a schematic view of stacks arranged vertically in FIG. 1.

Hereinafter, the present invention will be described in detail with reference to the drawings and the embodiments.

It should be noted that the following embodiments are provided for illustrating the present invention, rather than limiting the present invention.

The reference numerals throughout FIG. 1 to FIG. 7 include: stack array 1', stack group 2', reformer 3', single stack arranged vertically 4', stack array 1, stack group 2, reformer 3, single stack arranged horizontally 4, supporting body 5, supporting unit 6, fastener 7 and gas pipe 8.

Figure 4:
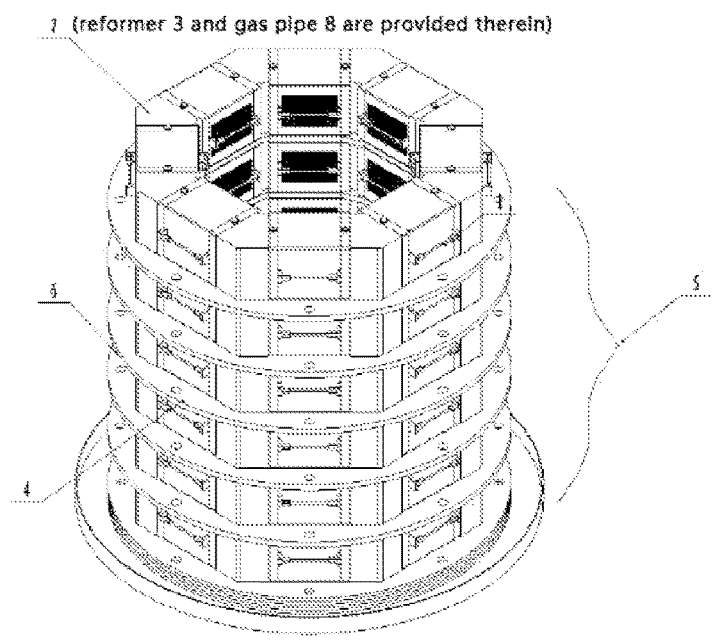
FIG. 4 is a schematic view of the structure of stack array according to embodiment 1 of the present invention.
Figure 5:
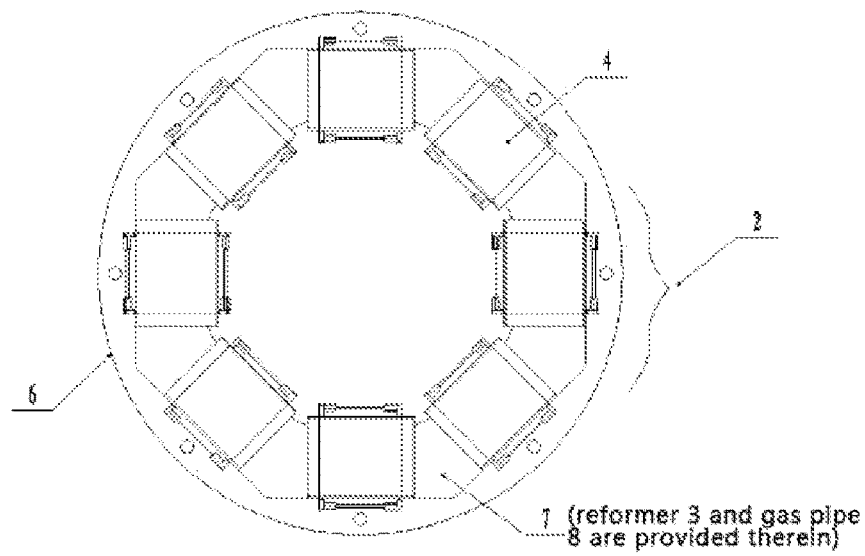
FIG. 5 is a schematic view of one arrangement of the stack group on each supporting unit in the stack array according to the embodiment 1 of the present invention.

Embodiment 1:

In the present embodiment, the stack array 1 in a SOFC power generation system is as shown in FIG. 4 and FIG. 5, the stack array 1 comprising a supporting body 5 and a plurality of stack groups 2. The supporting body has a layered structure comprising six layers of supporting units 6. The supporting units 6 are made of stainless steel.

As shown in FIG. 5, on each layer of supporting units 6, eight stacks 4 are arranged circularly to form a circularly arranged stack group 2, and thus the stack groups 2 on the six layers of supporting units 6, i.e., a total of forty-eight (48) stacks constitute the whole stack array.

Figure 3:
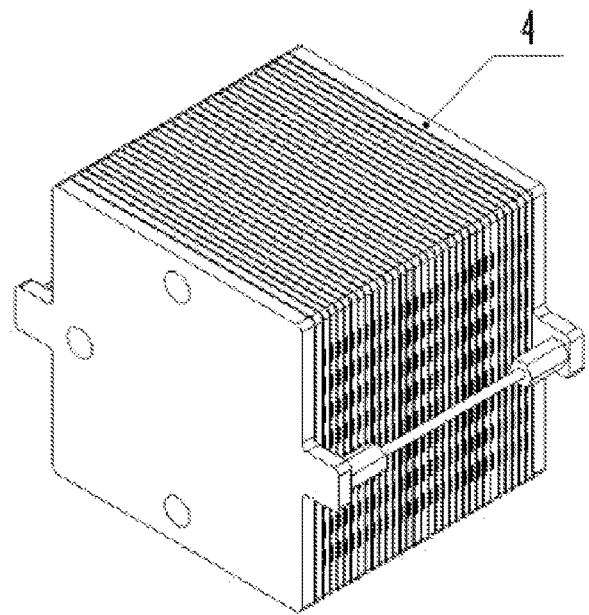
FIG. 3 is a schematic view of stacks arranged horizontally in the stack array of the present invention.

As shown in FIG. 3, each of the stacks 4 is horizontally arranged, that is, the plane where the gas inlet and the gas outlet of each stack are located is substantively vertical to the horizontal plane.

As shown in FIG. 5, a fastener 7 is provided between the two stacks 4 adjacent to each other. The stack groups, the fasteners, upper and lower supporting units altogether form a pressurized fastening structure to generate a pressurized fastening effect uniformly on the stacks. The fastener 7 is one selected from stainless steel wedge piece and ceramic wedge piece, or the combination of both, the ceramic wedge piece is used for insulation.

As shown in FIG. 5, the reformer 3 supplying gas to the stack array is provided in each of the fasteners 7, and the gas pipe 8 between the reformer 3 and the stack 4 is also provided in each of the fasteners 7, so that the reforming gas generated from each reformer 3 can be supplied to the stack 4 through the gas pipe 8 to generate power.

When the above stack array starts its operation, its power may reach 40 kW in its steady operation state.

Figure 6:
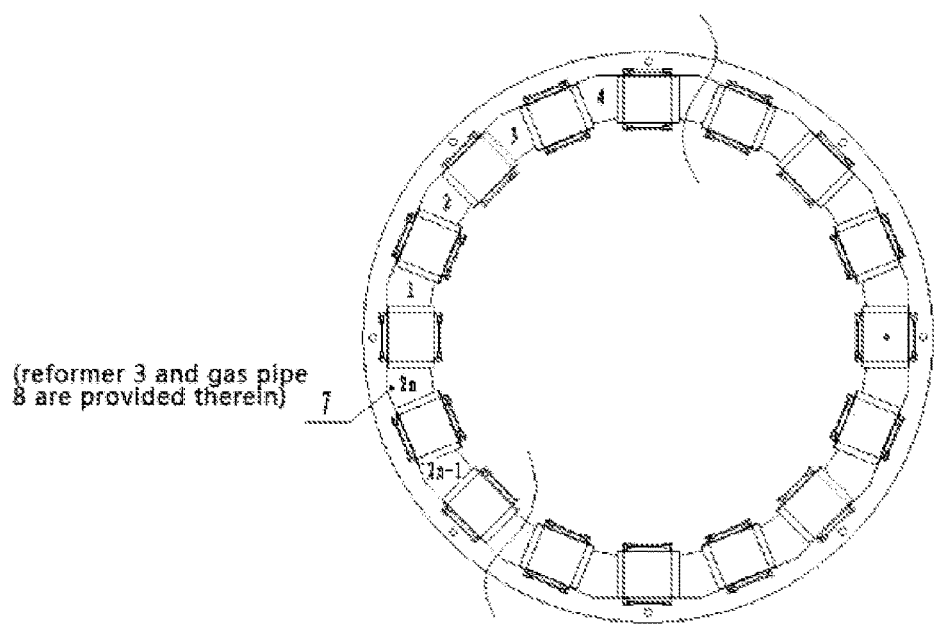
FIG. 6 is another schematic view of the stack group on each supporting unit in the stack array according to the embodiment 1 of the present invention.

In another implementation, as shown in FIG. 6, on each layer of supporting units 6, the number of the fasteners 7 arranged circularly is eight, and taking any one of the fasteners 7 as a starting point 1 for counting, the reformer 3 may be provided only in the $2^{nd}$, the $4^{th}$, the $6^{th}$ and the $8^{th}$ fasteners, and the gas pipe 8 may be provided only in the $2^{nd}$, the $4^{th}$, the $6^{th}$ and the $8^{th}$ fasteners, so that the reforming gas generated from the single reformer 3 can be supplied to the adjacent two stacks 4 through the gas pipe 8 to generate power, thus reducing the number of the reformers and manufacturing cost, and improving the efficiency of operation.

Embodiment 2:

In the present embodiment, the stack array in the SOFC power generation system is similar to the stack array shown in FIG. 4 and FIG. 5, the stack array comprising a supporting body 5 and a plurality of stack groups 2. The supporting body 5 has a layered structure comprising five layers of supporting units 6, and the supporting units 6 are made of stainless steel.

Similar to the structure shown in FIG. 5, on each layer of supporting units 6, seven stacks 4 are arranged circularly to form a circularly arranged stack group 2, and the stack groups 2 on six layers of supporting units 6, i.e., a total of thirty-five (35) stacks 4 constitute the stack array.

As shown in FIG. 3, each stack 4 is horizontally arranged, that is, the plane where the gas inlet and the gas outlet of each stack are located is substantively vertical to the horizontal plane.

Similar to the structure shown in FIG. 5, a fastener 7 is provided between the two stacks 4 adjacent to each other. The fastener 7 is one selected from stainless steel wedge piece and ceramic wedge piece, or the combination of both, the ceramic wedge piece is used for insulation.

Similar to the structure shown in FIG. 5, the reformer 3 is provided in each of the fasteners 7, and the gas pipe 8 between the reformer 3 and the stack 4 is also provided in each of the fasteners 7, so that the reforming gas generated from each reformer 3 can be supplied to the stack 4 through the gas pipe 8 to generate power.

When the above stack array starts its operation, its power may reach 30 kW in its steady operation state.

Figure 7:
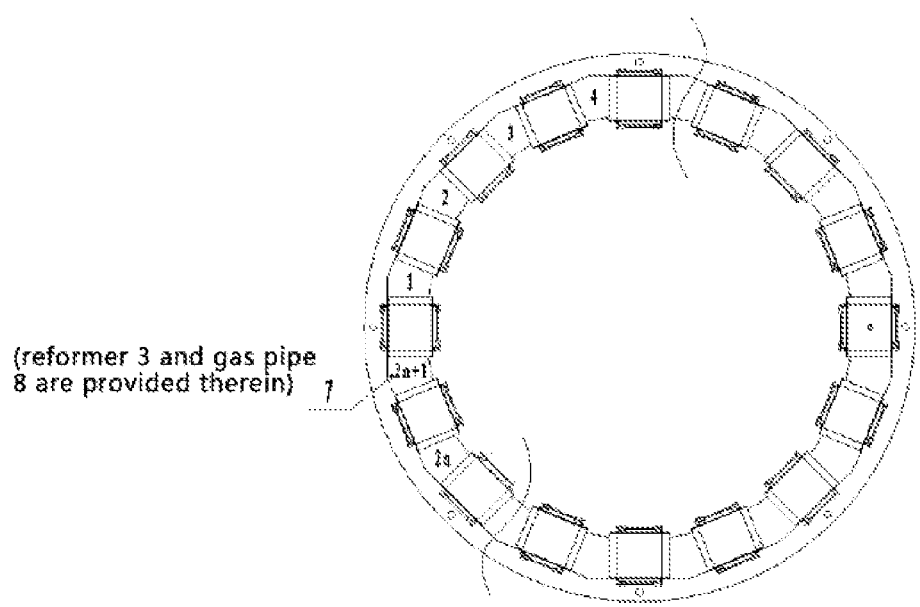
FIG. 7 is a schematic view of another arrangement of stack group on each supporting unit in the stack array according to the embodiment 2 of the present invention.

In another implementation, as shown in FIG. 7, on each layer of supporting units 6, the number of the fasteners arranged circularly is seven, and taking any one of the fasteners 7 as a starting point 1 for counting, the reformer 3 may be provided only in the $1^{st}$, the $2^{nd}$, the $4^{th}$ and the $6^{th}$ fasteners, or only in the $2^{nd}$, the $4^{th}$, the $6^{th}$ and the $7^{th}$ fasteners, and the gas pipe 8 may be provided only in the $1^{st}$, the $2^{nd}$, the $4^{th}$ and the $6^{th}$ fasteners, or only in the $2^{nd}$, the $4^{th}$, the $6^{th}$ and the $7^{th}$ fasteners, so that the reforming gas generated from the single reformer 3 can be supplied to the adjacent two stacks 4 through the gas pipe 8 to generate power, thus reducing the number of the reformers and manufacturing cost, and improving the efficiency of operation.

The technical scheme of the present invention has been particularly described with reference to the above embodiments, it should be understood that these embodiments are only some particular embodiments for illustration, rather than limiting the present invention. All the modifications, additions or equivalent substitutions within the principle of the present invention should be considered as encompassed within the protection scope of the present invention.

The invention claimed is:

1. A stack array in a Solid Oxide Fuel Cell (SOFC) power generation system, the stack array comprising a supporting body (5) and a plurality of stack groups (2);
    wherein, the supporting body (5) has a layered structure comprising at least one layer of supporting unit (6);
    each layer of the supporting units (6) supports at least one stack group (2);
    each stack group (2) consists of a plurality of stacks (4), and each stack (4) is horizontally arranged; and
    fasteners (7) are provided between the stacks (4) to enable the stack groups (2) and the supporting units (6) to form a pressurized fastening structure that is fastened and connected through a screw hole, and a reformer (3) is provided in the fasteners (7), and a gas pipe (8) between the reformer (3) and the stack (4) is provided in the fasteners (7).

2. The stack array in the SOFC power generation system of claim 1, wherein, in each of the stack groups (2), the plurality of stacks (4) are sequentially arranged to form a closed ring-shaped structure.

3. The stack array in the SOFC power generation system of claim 2, wherein, in each of the stack groups (2), the plurality of stacks (4) are circularly arranged to form a closed ring-shaped structure.

4. The stack array in the SOFC power generation system of claim 1, wherein, the fasteners (7) are made of ceramic or stainless steel.

5. The stack array in the SOFC power generation system of claim 1, wherein, the reformer (3) is selected from a group consisting of a single tube reformer, a multiple tube reformer or a plate reformer.

6. The stack array in the SOFC power generation system of claim 1, wherein, in each of the stack groups (2), the number of the stacks (4) is 3 to 12.

7. The stack array in the SOFC power generation system of claim 1, wherein, the supporting body (5) comprises 2 to 10 layers of the supporting units (6).

8. A SOFC power generation system, comprising the stack array of claim 1.

9. The stack array in the SOFC power generation system of claim 1, wherein the reformer (3) is provided in each of the fasteners (7).

10. The stack array in the SOFC power generation system of claim 1, wherein the reformer (3) is provided in some of the fasteners (7).

* * * * *